(12) United States Patent
Bryant

(10) Patent No.: US 6,909,215 B2
(45) Date of Patent: Jun. 21, 2005

(54) ELECTRIC MOTOR

(76) Inventor: John Graham Bryant, 17 Ffordd Aneurin Bevan, Sketty, Swansea SA2 9GZ (GB)

( * ) Notice: Subject to any disclaimer, the term of this patent is extended or adjusted under 35 U.S.C. 154(b) by 0 days.

(21) Appl. No.: 10/182,597

(22) PCT Filed: Jan. 25, 2001

(86) PCT No.: PCT/GB01/00284
§ 371 (c)(1),
(2), (4) Date: Sep. 20, 2002

(87) PCT Pub. No.: WO01/56140
PCT Pub. Date: Aug. 2, 2001

(65) Prior Publication Data
US 2003/0102751 A1 Jun. 5, 2003

(30) Foreign Application Priority Data
Jan. 28, 2000 (GB) .............................................. 0001888
Nov. 7, 2000 (GB) .............................................. 0027115

(51) Int. Cl.$^7$ ............................................. H02K 11/00
(52) U.S. Cl. ...................... 310/114; 310/112; 310/49 R
(58) Field of Search ................................ 310/112, 114, 310/49 R (56) References Cited

U.S. PATENT DOCUMENTS

| | | | | |
|---|---|---|---|---|
| 3,407,320 A | * | 10/1968 | McLean | 310/114 |
| 3,478,237 A | * | 11/1969 | Faxton | 310/114 |
| 5,485,046 A | * | 1/1996 | Kaplan et al. | 310/114 |
| 5,955,813 A | * | 9/1999 | Bolte et al. | 310/254 |
| 5,982,074 A | * | 11/1999 | Smith et al. | 310/261 |
| 6,002,193 A | | 12/1999 | Canini et al. | 310/268 |
| 6,160,328 A | * | 12/2000 | Hobson et al. | 310/20 |

FOREIGN PATENT DOCUMENTS

| | | | |
|---|---|---|---|
| DE | 1158624 B | 12/1963 | |
| EP | 0495582 A2 | 7/1992 | .......... H02K/19/00 |
| GB | 989172 | 4/1965 | |
| GB | 13633979 | 8/1974 | .......... H02K/1/16 |
| GB | 2329763 | 3/1999 | .......... H02K/29/03 |

OTHER PUBLICATIONS

Patent Abstracts of Japan vol. 016, No. 360 & JP04112699.
Patent Abstracts of Japan, vol. 007, No. 058 & JP57206296A.
Technology Alert, Ref. No. 7018, Brushless DC motor Position detection.
Technology Alert, Ref. No. 7017, Brushless and step motors.

* cited by examiner

*Primary Examiner*—Darren Schuberg
*Assistant Examiner*—J. Aguirrechea
(74) *Attorney, Agent, or Firm*—Philip M. Weiss; Weiss & Weiss (57) ABSTRACT

An electric motor comprising a shaft 300 on which is mounted n motor modules (where n is an integer). Each motor module consists of two generally disc-shaped rotors 302 having a coil 304 sandwiched between them. Each rotor/coil module is separated from the adjacent module by an insulative spacer element 306 and a PTFE disc 308 which is mounted on the shaft 300 concentrically with the rotors 302 and the coil 304. The axis about which each coil 304 is wound is substantially in line with the axis of rotation of the respective rotors 302.

18 Claims, 13 Drawing Sheets

PRIOR ART

Full diagram of a 5 phase motor driver showing the minimum components for 60w at 12 volts

ELECTRIC MOTOR

This invention relates to an electric motor and, in particular, to an electric motor which can be operated using either a dc or ac power supply for use in a wide range of applications, including industrial, domestic and automotive.

Figure 1A:
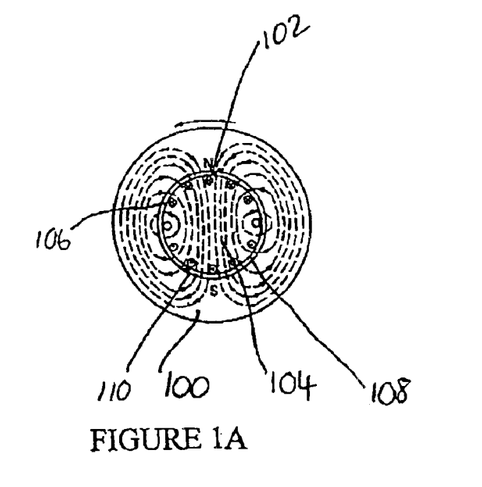
FIGS. 1A and 1B are schematic side and front views of a three-phase induction motor according to the prior art.

Many different types of electric motor, both ac and dc, are well known and widely used in various applications. For example, referring to FIGS. 1A and 1B of the drawings, a three-phase induction motor in accordance with the prior art comprises a generally cylindrical stator 100 having three-phase windings (not shown), and a rotor 102 comprising a laminated rotor core 104 supporting a plurality of conductors, for example, uninsulated copper or aluminum bars 106, in semi-enclosed slots in the rotor core 104. The bars 106 are short-circuited at each end by plates or rings 108 to which the bars are brazed or welded. The airgap 110 between the rotor 102 and the stator 100 is uniform and made as small as is mechanically possible.

Figure 1B:
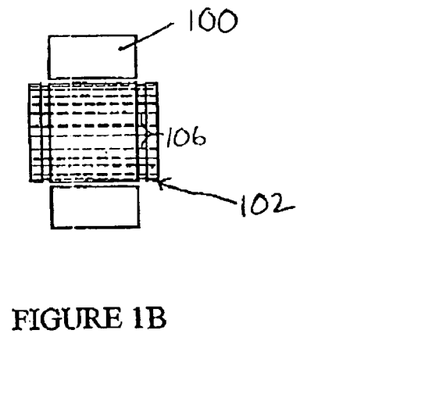

The motor is supplied with three-phase currents which produces a rotating magnetic flux. If the stator 102 is wound for two poles, the distribution of the magnetic flux due to the stator currents at a particular instant is shown in FIG. 1B. The rotating magnetic flux generates an e.m.f. in one or more of the rotor conductors 106, and the e.m.f. generated in a rotor conductor is a maximum in the region of maximum flux density. If the flux is assumed to rotate anti-clockwise, as denoted by arrow 112 in FIG. 1B, the directions of the e.m.f.s generated in the stationary rotor conductors 106 are indicated by the crosses and dots in FIG. 1B. Referring to FIG. 1C, the e.m.f. generated in the rotor conductor 106 shown circulates a current the effect of which is to strengthen the flux density on the righthand side and weaken that on the lefthand side, i.e. the flux in the gap is distorted as indicated by the dotted line 114. Consequently, a force is exerted on the rotor 102 tending to drag it in the direction of the rotating flux.

However, there are may applications in which it is impractical or simply impossible to employ a three-phase power supply.

Figure 2A:
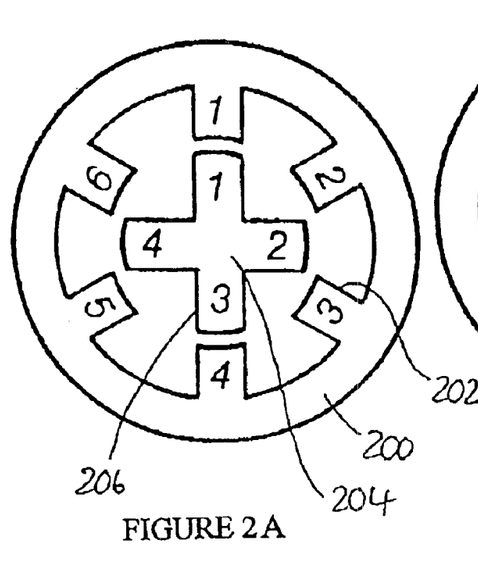
FIGS. 2A and 2B are schematic front views of a dc stepper motor according to the prior art.
Figure 2B:
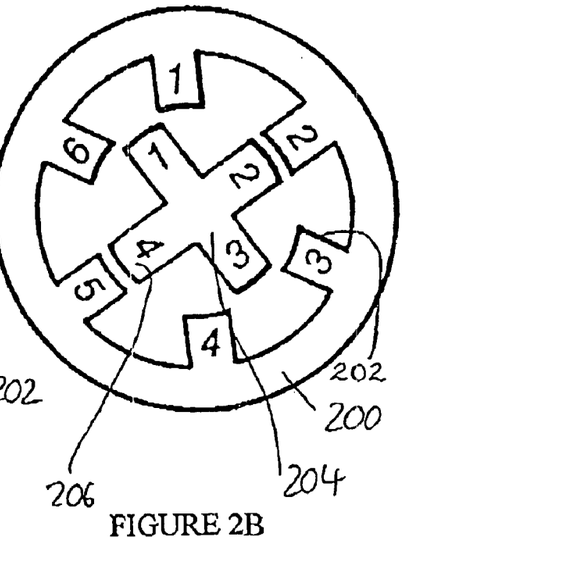

FIGS. 2A and 2B show another type of motor, known as a stepper motor, which comprises a stator 200 with six stator teeth 202 and a rotor 204 with four rotor teeth 206. Each stator tooth 202 has a coil (not shown) wound around it which is energised by a dc current. When stator teeth 1S and 4S are energised the rotor teeth 1R and 3R align with them. If stator teeth 2S and 5S are next energised, rotor teeth 2R and 4R will align with 2S and 4S, i.e. the rotor moves anticlockwise by 30°. Similarly, for an eight-tooth rotor and a twelve-tooth stator the step angle would be 15°.

However, known dc stepper motors have the disadvantage that it is not possible to produce a torque high enough to be practical for many applications, especially where the size of power supply is limited, such that it is necessary to employ gears, etc.

An improved arrangement has now been devised.

In accordance with a first aspect of the present invention, there is provided a motor arrangement comprising a shaft on which is mounted n motor modules, each module comprising at least one rotor, at least one stator and at least one respective energising coil, the axis about which the coil is wound being in line with the axis of rotation of the rotor, the stator at least partially surrounding the periphery of the rotor and the coil, where n is an integer.

Each module preferably comprises two rotors with an energising coil sandwiched therebetween. The motor arrangement preferably comprises at least five, and more preferably eleven, modules mounted on the same shaft. The rotors are preferably provided with peripheral, possibly but not necessarily equally-spaced teeth or pick-up points which form attracting poles when the arrangement is in use. The rotors of at least some and preferably all of the modules are preferably angularly displaced relative to each other.

The stator preferably comprises inwardly projecting teeth which beneficially substantially correspond to the teeth of the respective rotor or rotors in both width and spacing.

The arrangement preferably further comprises a control circuit arranged to supply an energising current to each of the coils in a predetermined sequence. When a coil is energised, an attracting magnetic force pulls a pole of the rotor in the direction of the magnetic force. In a preferred embodiment, the rotors are fixed to the shaft such that rotary movement of the rotors produces corresponding rotation of the shaft. The control circuit preferably includes means for feeding the flyblack current produced in the coil windings back to the power supply.

Each module preferably comprises an individual stator, but it is envisaged that the stator of the arrangement may be a single body which surrounds some or all of the modules.

It will be understood that in the preferred embodiment of the first aspect of the invention, where the rotor poles are peripheral, the moment causing rotation of the rotor is at a maximum adjacent the outer periphery of the motor (with the coil being on the inside). Torque is directly proportional to the distance of the moment from the axis of rotation, thus torque is maximised for any size of motor.

In accordance with a second aspect of the present invention, there is provided a motor arrangement comprising a shaft on which is mounted a plurality of motor modules, each module comprising at least one rotor, a coil and a stator, the rotors of at least some of the modules being angularly displaced relative to each other and the coils of the modules being energised individual in a predetermined sequence, where n is an integer greater than 1.

In accordance with a third aspect of the invention, there is provided a motor arrangement comprising a shaft on which is mounted n motor modules, each module comprising at least one rotor, a stator and a coil, the motor further comprising control means including control means for providing an energising current to the coil of each module individually in a predetermined sequence; the control means including means for varying the number, size, timing and/or frequency of the energising currents supplied to the coils, where n is an integer greater than 1.

In accordance with a fourth aspect of the present invention, there is provided a motor arrangement comprising at least one rotor, at least one stator and at least one respective energising coil having a plurality of windings, the arrangement further comprising a power supply and means for feeding a flyback current produced in said coil windings back to said power supply.

Thus, the fourth aspect of the invention provides means for reusing surplus energy, thereby increasing efficiency.

In accordance with a fifth aspect of the invention, there is provided a linear motor comprising a moveable part on which is mounted a plurality of spaced apart attracting poles, and a stationary part on which is provided a plurality of coils, said moveable part and said stationary part being substantially parallel to each other with the attracting poles and the coils generally facing each other, the motor further comprising means for supplying an energising current to each of said coils individually in a predetermined sequence, thereby moving said moveable part in a predetermined direction.

In accordance with a sixth aspect of the invention, there is provided a coil for use in a motor, said coil comprising one or more two-layer windings, one of the layers being wound inwards from its periphery to a position at or adjacent its centre, and the other layer being wound from the position at or adjacent the centre outwards to its periphery.

Also in accordance with the sixth aspect of the present is invention, there is provided a method of making a coil for use in a motor, the method comprising the steps of providing one or more two-layer windings by winding one of the layers inwards from its periphery to a position at or adjacent the centre and winding the other layer outwardly from the position at or adjacent the centre to the periphery.

It should be noted that the architecture of the motor arrangement(s) of the present invention could be employed as an alternator for AC or a generator for DC. By varying the excited current, the amplitude/phase and phase velocity can be adjusted by gating the coils that accordingly can be synchronised with the mains.

Other preferred features of the invention, as well as applications and advantages will become apparent from the following descriptions.

Exemplary embodiments of the invention will now be described with reference to the accompanying drawings, in which.

Figure 3:
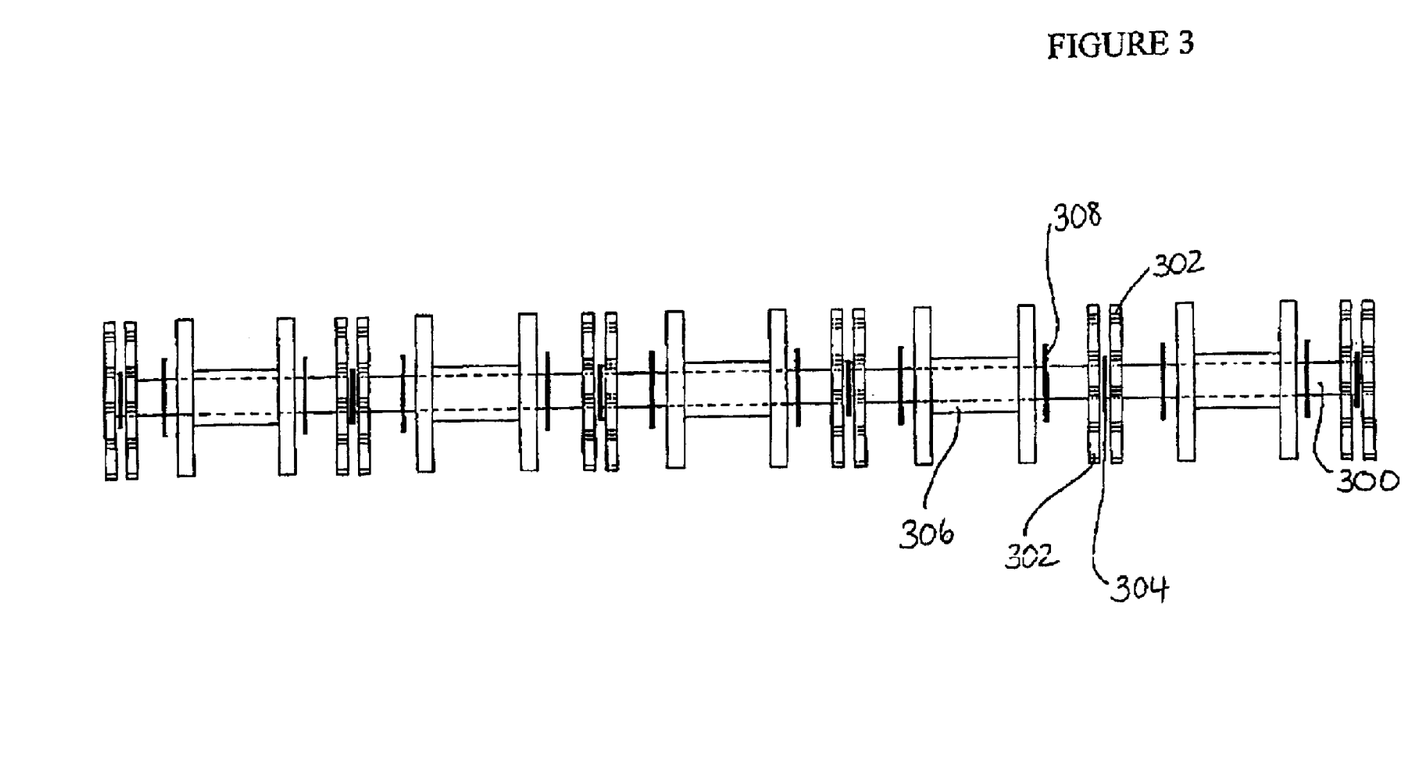
FIG. 3 is a schematic diagram of a motor according to an exemplary embodiment of the invention, with the enclosure omitted.
Figure 4:
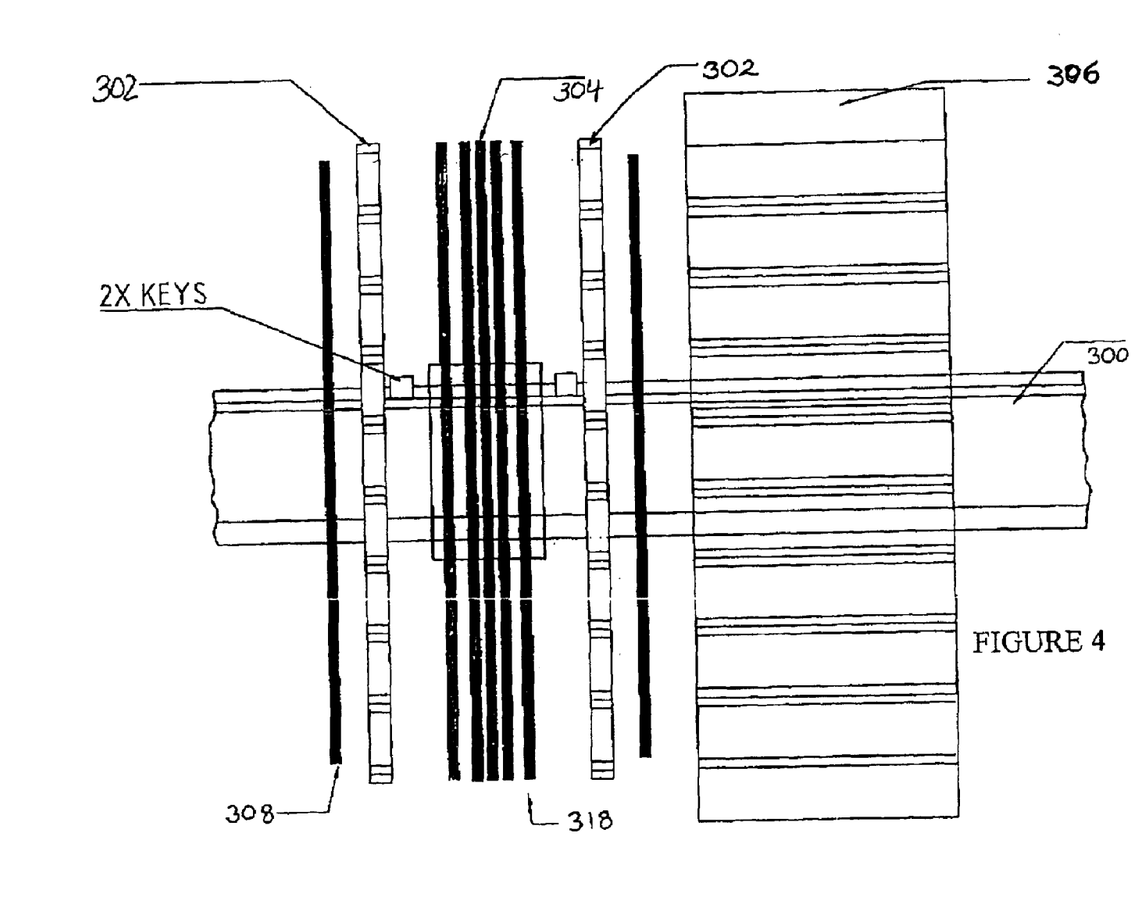
FIG. 4 is a schematic diagram of one module of the motor of FIG. 3.

Referring to FIGS. 3 and 4 of the drawings, a first exemplary embodiment of a motor according to the present invention comprises a modular arrangement mounted on a central, elongate shaft 300. Each module consists of two generally disc-shaped rotors 302 having a coil 304 sandwiched between them. Each rotor/coil module is separated from the adjacent module by an insulative spacer element 306 and a PTFE disc 308 which is mounted on the shaft 300 concentrically with the rotors 302 and the coil 304.

Figure 5A:
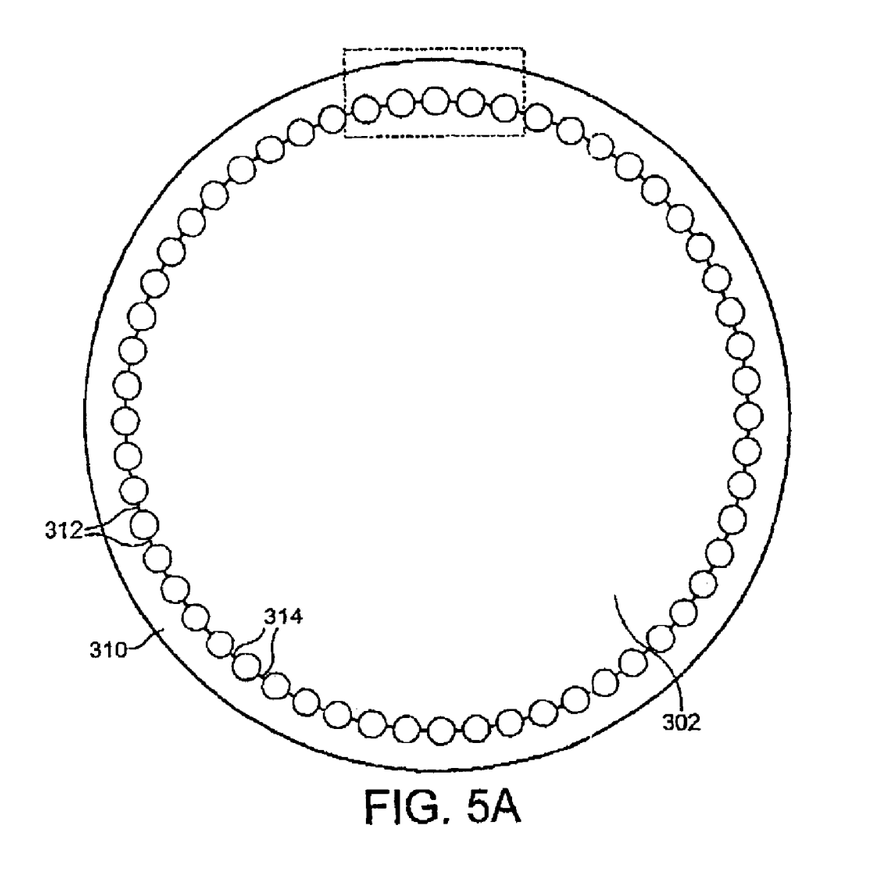
FIG. 5A is a front view of a stator and rotor for use in a motor according to an exemplary Embodiment of the invention.
Figure 5B:
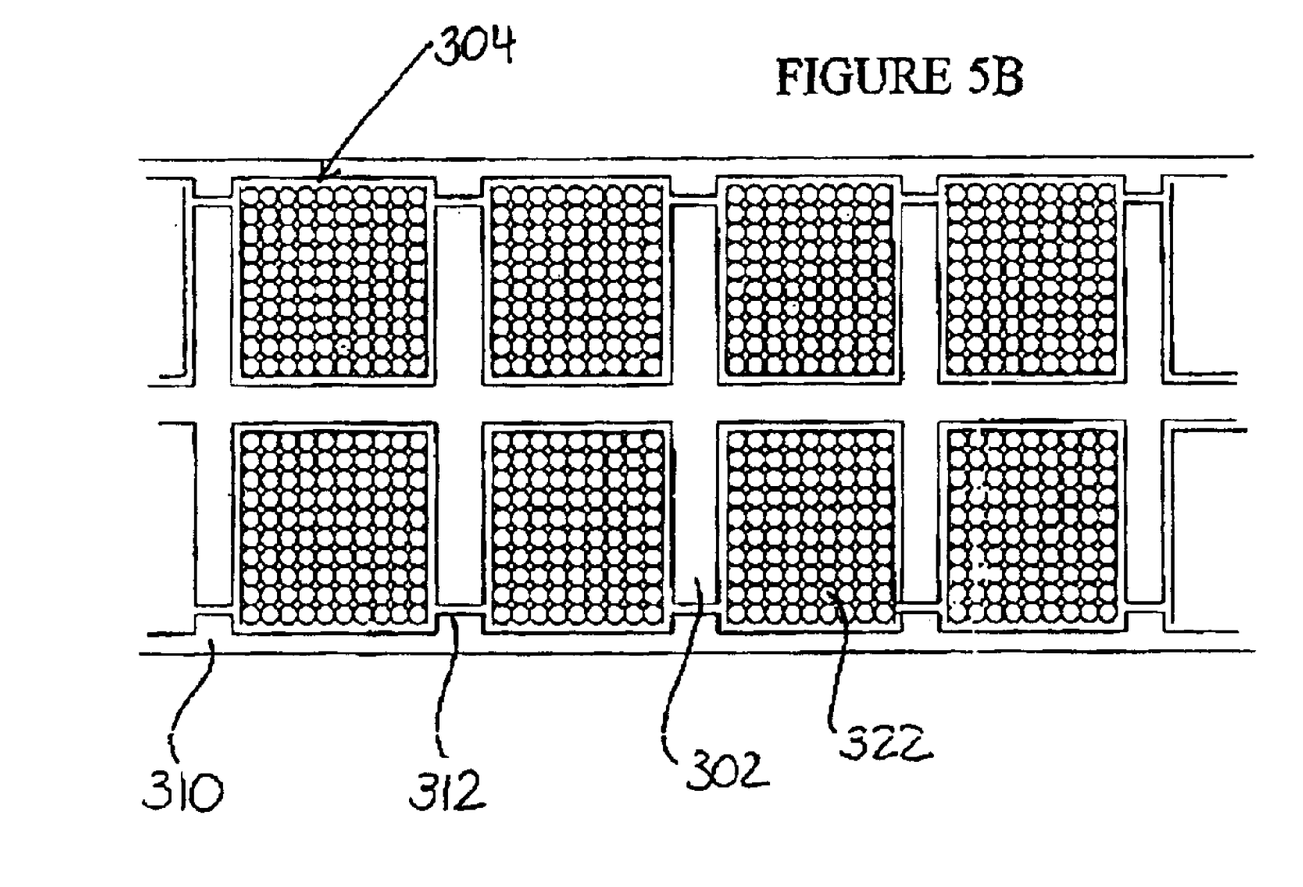
FIG. 5B is a schematic side cross-sectional view of part of a motor according to an exemplary embodiment of the invention.
Figure 6:
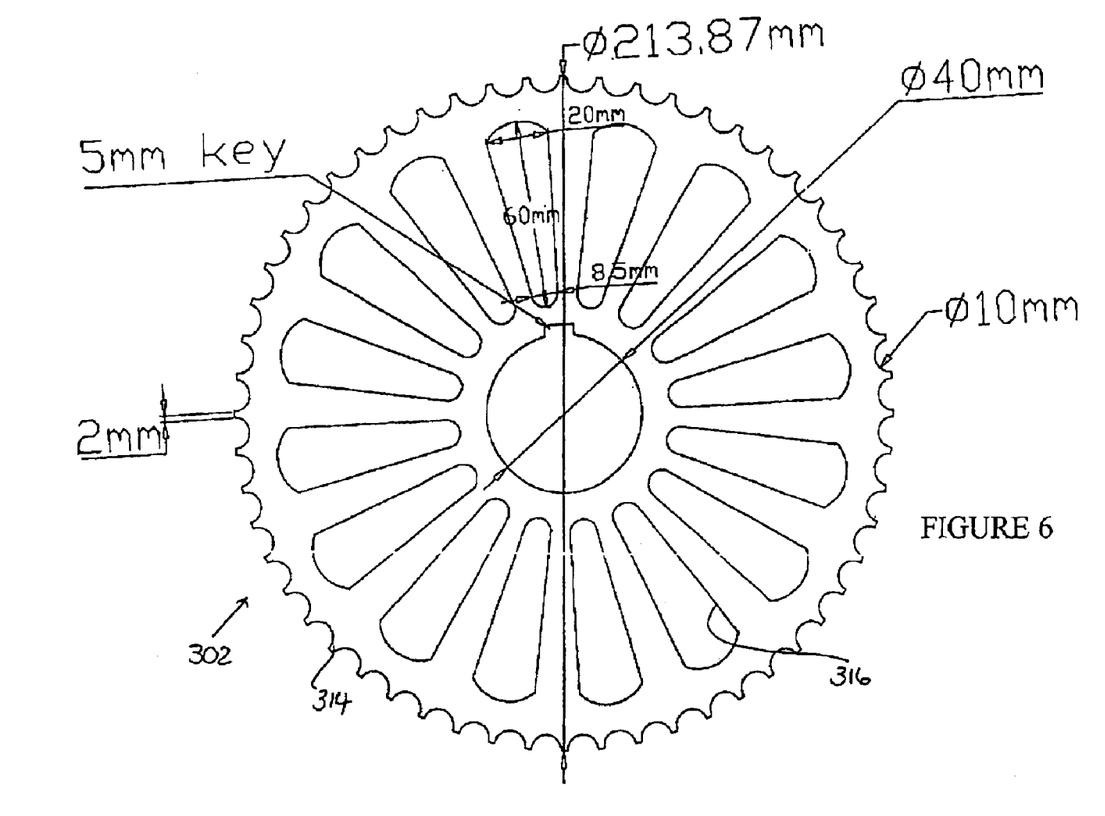
FIG. 6 is a front view of a rotor for use in a motor according to an exemplary embodiment of the invention.

Referring now to FIG. 5A and FIG. 5B, in which the dimensions shown are not intended to be in any way limiting, but are merely present to illustrate one particular exemplary embodiment, each module of the structure shown in FIG. 3 is housed within a generally cylindrical enclosure 310 of a magnetically conducting material. The inner surface of the enclosure 310 is provided with a plurality of teeth 312 or "pick-up" points. The rotors 302 are generally disc-shaped as stated above, and are provided with circumferential teeth 314 which form attracting poles when the apparatus is in use. The rotor teeth 314 and the enclosure teeth 312 correspond with each other in both number and spacing to provide an arrangement as shown in FIG. 5. Thus, the attracting poles of the rotor are within the enclosure, which enables the maximum radial forces to be produced relative to the diameter of the motor, whilst not compromising the magnetic circuit by depleting the flux supporting metalwork to a level where saturation would otherwise occur. This is achieved by providing the coil 304 with its axis through the rotor 302 (rather than perpendicular to it) with the rotor 302 and the enclosure 310 completing the magnetic circuit (in the same way as an efficient solenoid). Referring to FIG. 6, in which the dimensions shown are once again not intended to be in any way limiting but are merely intended to illustrate one specific exemplary embodiment, the rotors 302 are provided with a plurality of cut-away portions 316 which reduces the weight (and there fore inertia of the rotor 302) and also reduces eddy currents. The rotors 302 may be formed of CR4 steel of, say, 2 mm thickness.

Figure 7:
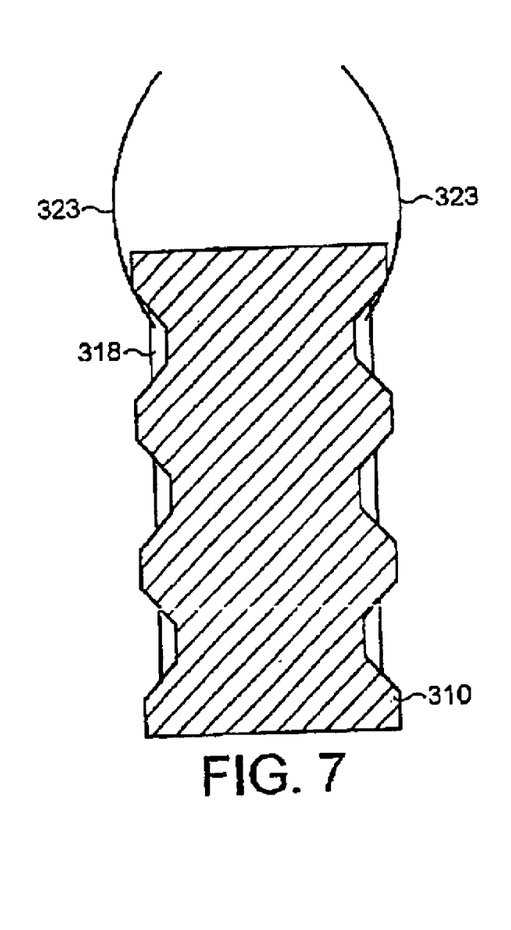
FIG. 7 is a plan view a stator (enclosure) and coil spool for use in an exemplary embodiment of the invention.
Figure 8:
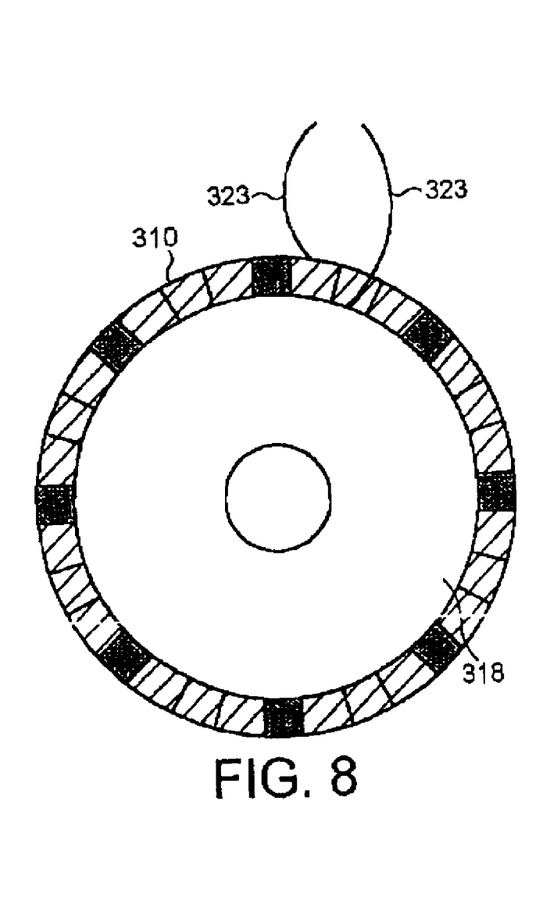
FIG. 8 is a front view of the stator (enclosure) and coil spool of FIG. 1.

Referring to FIGS. 7 and 8 of the drawings, the coil 304 comprises a generally disc-shaped spool 318, supporting a coil 322 (FIG. 5B). The wires 323 are intended to illustrate the drive wires supplying the energising current to the coil 322.

Winding a conventional spool has one end of the coil leading to the inside of the winding and the other from the final layer. For coils of a large number of turns, the voltage required to drive them demands insulation that will sustain at least twice that of the power source when driven by a pulse-width modulated waveform. Usually, failure occurs at the point where the terminating coil wire crosses the turns of the beginning.

The capacitance of a horizontally layered coil is also unpredictable, even when wound by machine, so the natural resonance of the coil has a wider tolerance.

These problems are solved in one embodiment of the present invention by winding the coils in two-layer spirals, each connected at the periphery to the next layer until the coil is constructed. Thus, in this embodiment, the coil is wound on the spool 318 from a position at or adjacent the periphery of the spool 318 inwards to a position at or adjacent its centre to produce a first turn, and outwards from a position at or adjacent its centre towards the periphery to produce the next turn, and so on until the required number of turns is achieved. This configuration ensures that the ends of the coil are kept at a maximum distance, and therefore minimises capacitance as well as moving the natural resonance of the coil to a higher frequency range, allowing a faster pulse rate and lower winding losses. The coil 322 may be a printed circuit coil, which can be manufactured using existing machinery utilising very thin inter-winding insulation layers, as each layer only sees a function of the applied voltage divided by the number of layers. This type of construction could be achieved using metallic inks silk-screened onto plastic membranes.

Figure 9:
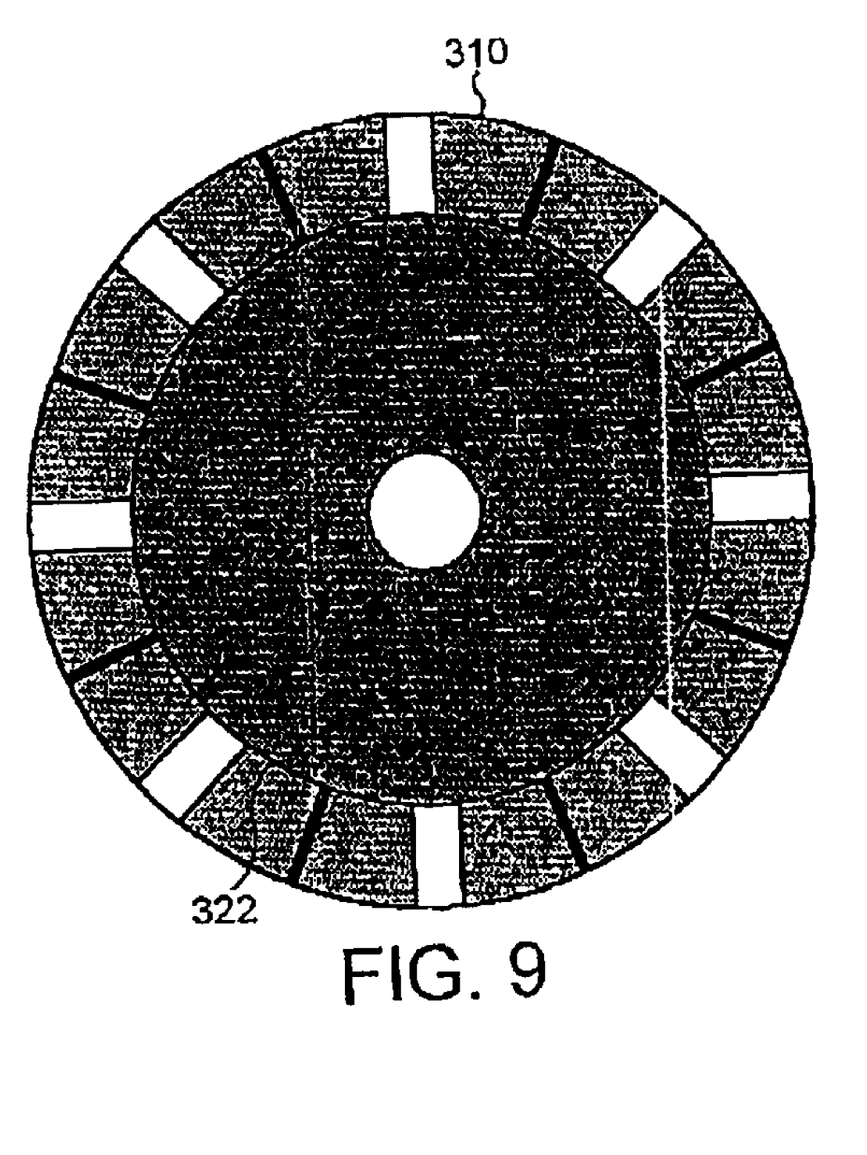
FIG. 9 is a front view of a stator (enclosure, spool and coil for use in an exemplary embodiment of the invention.

In another embodiment of the invention, the coils 322 may comprise an insulative (for example, polymer such as nylon) structure, the windings being formed by loading the polymer with magnetic powder, such as soft iron (see FIG. 9).

The capacitance of each layer of the coil 322 is fixed by the geometry (making it a direct design parameter), and in the above-described embodiment, the capacitance can be made very low.

The spool 318 may provide a suitable bearing surface for the rotor for low speed and light duty applications, especially if use is intermittent.

In one preferred embodiment of the intention, the motor comprises eleven modules or segments mounted on a common shaft, and the preferred configuration of each rotor is shown in FIG. 6 of the drawings. In another exemplary embodiment of the invention, the motor may comprise five modules or segments. In either case, the rotors 302 may be fixed to the shaft 300 such that rotation of the rotors 302 results in corresponding rotary movement of the shaft 300. Alternatively, the rotors 302 may be rotatably mounted on the shaft and fixed to the enclosure, such that rotation of the rotors 302 results in corresponding rotary movement of the enclosure 310.

Figure 10A:
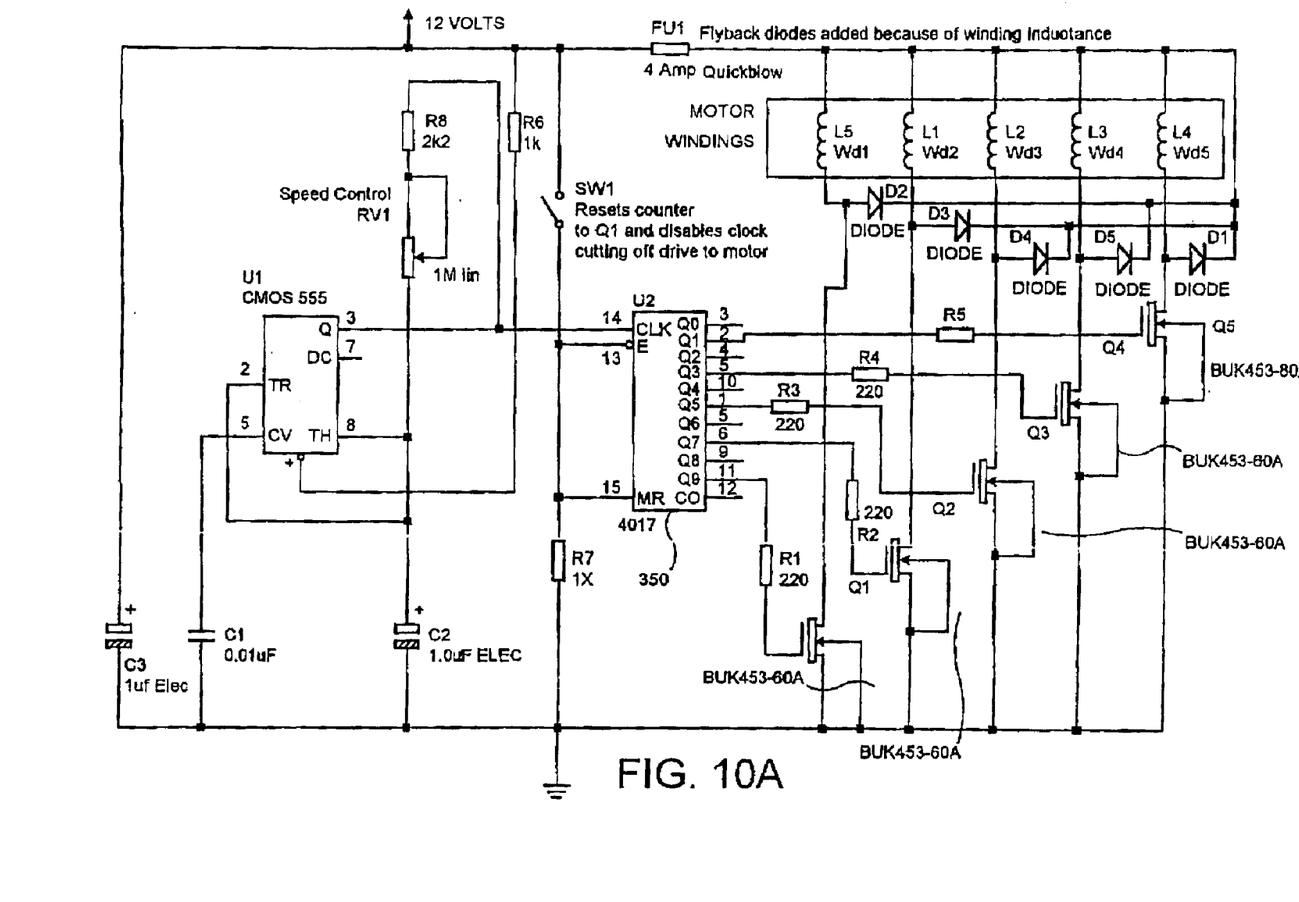
FIGS. 10A and 10B are circuit diagrams of control circuits for use in controlling motors according to exemplary embodiments of the invention.
Figure 10B:
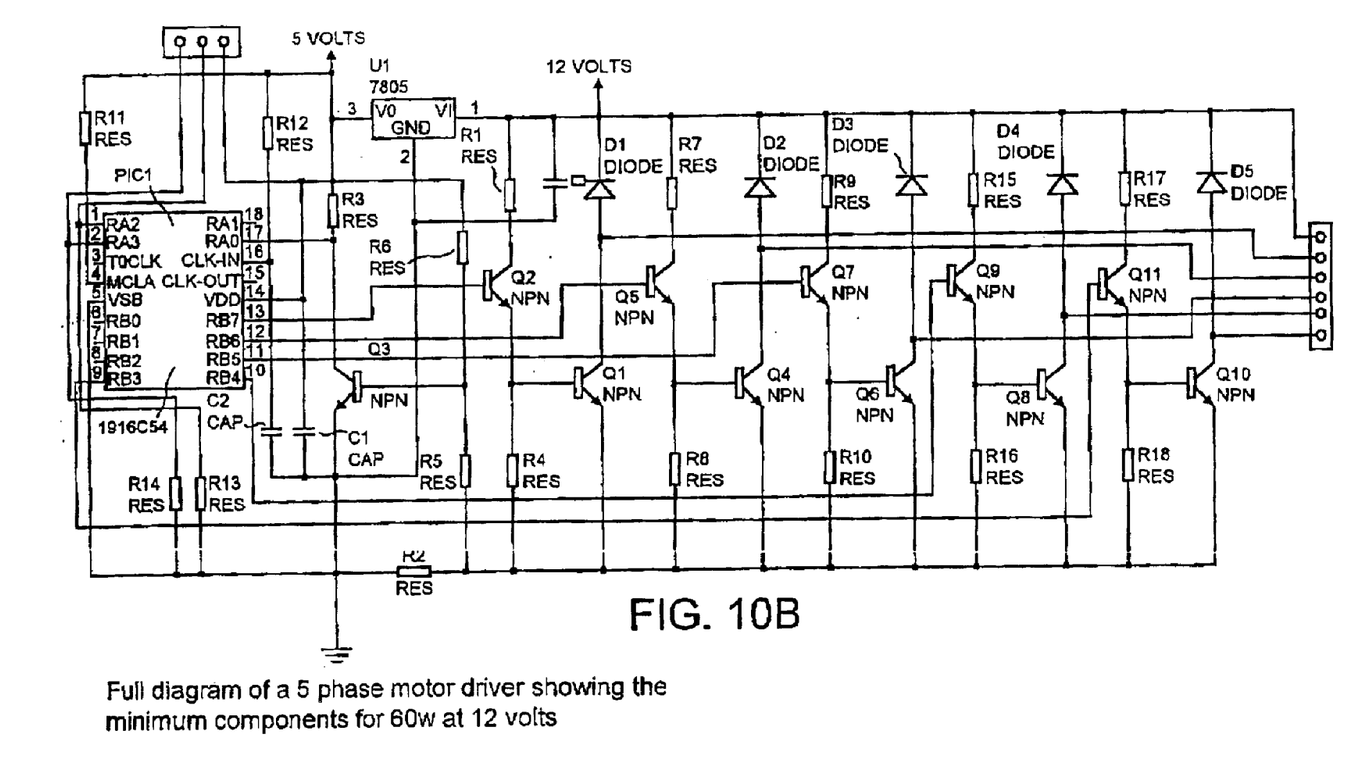

Referring to FIGS. 10A and 10B of the drawings, a control circuit is provided which is arranged to provide a plurality of pulses in a predetermined sequence, the control circuit being microprocessor controlled). The control circuits shown in FIGS. 10A and 10B of the drawings are arranged co provide 5 pulses per cycle. However, this number can be increased by simply selecting more outputs from the counter 350. The preferred embodiment of the invention consists of eleven modules or segments, each including two rotors 302 such as the one shown in FIG. 6 and a coil, i.e the preferred embodiment of the invention includes eleven coils, and eleven energising pulses per cycle are therefore required to be produced by the control circuit.

The control circuits shown are designed to operate by means of a 12V dc power supply, but the motor of the present invention can be designed to work on any supply voltage, including ac, which enables the realisation of motors to range in size from a fraction of a horsepower up to 100 hp or more.

Control is compound where up to just less then half of the windings of a coil can be driven at the same time to achieve the maximum starting, running or braking torque. Diode pairs may be provided to feed backlash currents back into the supply across the drive transistors. Accurate positioning of the motor can be achieved by monitoring the ramp currents across individual coils. Micro-stepping (of drive pulses) is achieved by the use of a simple micr-controller for very fine tolerance applications. The use of a stochastic drive can reduce power to the dynamic point of delivery, after which a lower level of sustainable torque can be maintained by closing down pulse widths and/or dropping drive pulses altogether, thereby offsetting several problems often encountered in known motors.

The circuit shown in FIG. 10B is a discrete transistor drive and a base-line micro-controller, with current sensing to allow for proportional control for use in, for example, headlight positioning in a vehicle. Alternative driver circuits may employ BIMOS or MOSFETS.

If the supply voltage is ac, the motor may be controlled by a driver circuit having thyristors or triacs and an isolating circuit, such that the motor could be driven direct from the mains supply. The efficiency of the ac motor according to an embodiment of the invention is substantially the same as that of a dc motor of the invention, but control should be from a standstill to full design speed with an almost flat torque.

Figure 11:
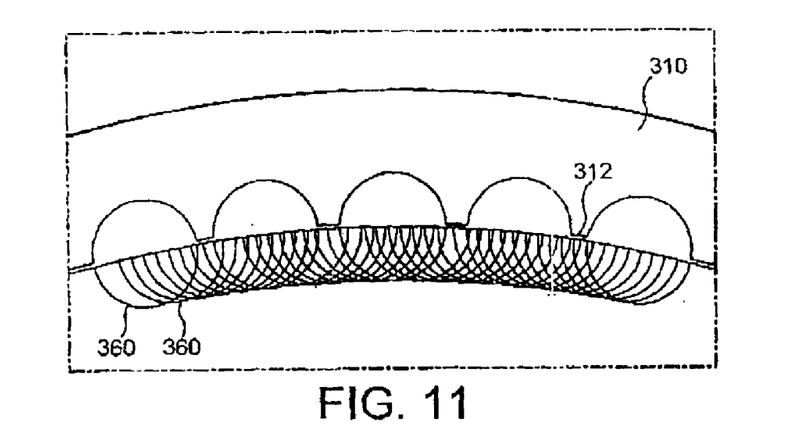
FIG. 11 is a schematic diagram the energizing pulses applied to the coils of a motor according to an exemplary embodiment of the invention.
Figure 12A:
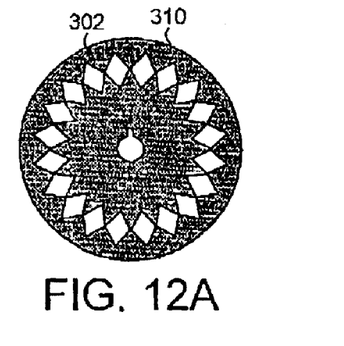
FIG. 12A is a front view of a stator and rotor for use in a motor according to an exemplary embodiment of the invention.
Figure 12B:
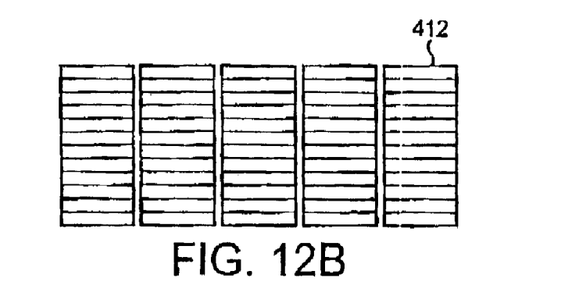
FIG. 12B is a schematic side view of five stator segments for use in a 5-stage motor according to an exemplary embodiment of the invention.
Figure 12C:
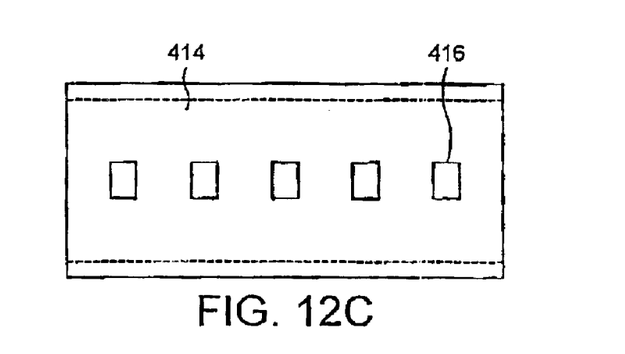
FIG. 12C is a schematic side view of an outer body for the motor of FIG. 12B.
Figure 12D:
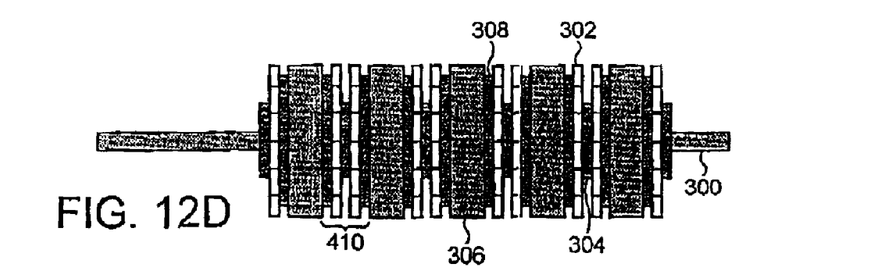
FIG. 12D is a schematic side view of a 5-stage motor according to an exemplary embodiment of the invention.

In each cycle, each coil of the motor is energised by a single pulse, the coils being energised in a predetermined sequence. This gives an overall energising current consisting of eleven pulses 360 per cycle, each pulse being slightly out of phase relative to the preceding pulse, as shown in FIG. 11. Each of the rotors 302 is mounted on the shaft so as to be slightly angularly offset relative to the rotors of the adjacent module or modules, the angular offset in each case corresponding to the phase difference between the energising pulses. The change of current (from zero to a peak and back to zero) in a coil as it is energised creates a magnetic flux between the rotor 302 and the enclosure 310 (the enclosure 311) completing the magnetic circuit between the coil and the rotor), which in turn sets up an e.m.f. in a pole of the rotor 302 and pulls it in the direction of rotation of the magnetic flux, in this case, clockwise by one "step". In the example illustrated in FIG. 11, there are eleven "steps" between the centres of two adjacent enclosure (or rotor) teeth 312 (314). In order to reverse the direction of rotation of the rotors, the sequence of energising pulses can be provided in reverse order, which function can be realised by the control circuit shown in FIG. 10A or 10B and triggered by a reverse sequence button (not shown) or the like.

The control circuits shown in FIGS. 10A and 10B are just examples of the configurations(s) which would be used. Many different configurations are envisaged according to various preferences, design parameters, potential applications etc. In general, in preferred embodiments, at processor is pre-programmed with the maximum and minimum pulse widths required for a particular type of motor and will, as a function of a feedback sensor, compile the correct pulse widths for the motor to match the speed, torque and direction commands from an external master. This may be via an interface not shown in the drawings.

The feedback sensor reads the current profile of each coil being driven as a function of time for a voltage across a sense resistor such as a crack/resistor designed as artwork onto (a PCB) reaching a predetermined value. This period, measured in microseconds, gives the physical position of each pole as a function of inductance, the lag between predicted and actual gives a value that represents the torque supplied to the load, a negative value also describes the deceleration profile allowing a breaking strategy to be applied.

It is important to determine precisely where by rotor 302 is positioned with respect to the stator or enclosure 310. This is achieved by current sensing for the feed back and drive. Reference is made below to aligned and non-aligned poles and it is important to note that non-aligned means top dead centre, i.e. the point at which a rotor pole or tooth 314 is positioned precisely centrally between two adjacent enclosure teeth 312 or "pick-up points".

A square wave input into the motor initially overcomes the capacitance of the coil and the surrounding circuit in the form of a step, after which the integration is linear in profile and is a function of the inductance and the applied voltage that provides a ramp. The time "t1" at start time to "t2" at cut off is in the order of microseconds with the wave form being saw toothed. From this it is possible to measure the precise position of the poles on the rotor to those of the stator or enclosure.

The larger the air gap between the rotor and stator, the lower the inductance Thus, when a rotor pole or tooth and stator tooth or pick-up point are precisely aligned, the inductance is at a maximum. However, at "top dead centre" i.e. in the case of "non-aligned" poles, the inductance is at a minimum and the poles receive a tiny pulse, which provides a magnetic bias, while aligned poles in fact return power to the supply.

A sinusoidal profile is preferably adopted for both the acceleration and de-acceleration of the motor so that there will always be a smooth characteristic.

High current high speed bipolar power transistors may be used to provide a low dissipation drive assembly by the use of a transformer isolated interface which is in itself driven by a bipolar buffer directly from the controller chip.

A variable reluctance motor traditionally has a single transistor drive that has to sustain or absorb the unused energy stored in the windings. This is accomplished by having the driver linger in the linear region or dissipate the energy in the resistor/s of a snubber circuit, both options being very inefficient. Some designs place a capacitor in parallel with the winding, which has the effect of storing the energy returned by the winding if the correct value is selected, but also places a greater burden on the drive transistors in the form of a low resistance path to the supply rail or ground that has: to be charged at the same time as delivering current to tie coils. There is also a less obvious problem in the shape of a tuned circuit of indeterminate resonance due to the infinite variations of pole position and speed of rotation, and if a drive frequency that approached resonance where achieved, then the torque would be severely compromised. As one of the objects of the invention is to deliver a useful torque over the full operating range, any winding capacitance is minimised in the drive circuitry.

In general, the drive circuits for use with the present invention can be arranged to return as much as 90% of unused energy back to the supply and can be arranged to do so actively to reduce the energy lost in steering diodes to a minimum, as though it was a standard drive system.

In one exemplary embodiment, the drive stages may be arranged so that the winding of the motor is driven in a full bridge configuration, allowing the fly-back current to be returned to the supply via a saturated transistor pair during the high current period to increase efficiency and lower dissipation, the rest of the energy being handled by protection diodes.

Braking is achieved by exciting the coils of the motor by initiating a residual magnetic bias in a winding that is half way between poles (a function not carried out when the motor is driven), effectively applying an excitation component. This component becomes more pronounced for it and the windings immediately flanking it producing a back EMF that feeds back current to the supply and provides a mechanical resistance to the rotation of the motor, much like an alternator. As braking takes hold, the excitation current becomes unnecessary and falls quickly toward zero.

The acceleration profile of the motor is based upon a sine profile, this gives a smooth response with controlled torque and very low noise. An operating profile is not new as it is used in the control of stepper motors of various designs but the stepping characteristic is usually based upon a single pulse per step, with attendant noise at very low revs.

The motors of the present invention are best suited for use in low to medium speed applications, offering direct drive without the need for gears. It is in the gears that most losses occur and it is here that these designs can offer an efficient solution.

The main effect experienced in driving any coil where the output is to be a work function is the Incomplete magnetic paths involved. Any gapped coil will have a reduced inductive value directly proportional to the difference between what is and being a closed magnetic circuit. A gapped coil can be looked upon as a dynamic energy storage medium, as the energy injected into the coil that is not used in the work function arises as an EMF across the drivers to be dissipated in some way. The circuit included with this text addresses this effect by redirecting the greater part of the backlash from the motor windings back into the supply and so reduce any losses involved.

A P channel MOSFET may be used to gate current to all the coils in a motor arrangement and therefore must switch at the combined speed of each N channel MOSFET connected to each winding, thereby reducing the number of switching devices used for the power circuit.

The motor arrangement of the invention requires the minimum of switching components to achieve the desired coil inversion to channel the backward EMF back into the supply via the steering diodes, this also has the effect of extending the magnetic period into the rotational movement for low power steps giving better control over that instant for the low impedance coils desirable for this type of construction.

Referring to FIGS. 12A to 12D of the drawings, another exemplary embodiment of the present invention comprises five modules (i.e. five coils), the control circuit being arranged to provide a 5-phase energising current. Each module 410 is housed within a generally cylindrical segment 412 of magnetically conducting material and the whole arrangement is housed within a generally tubular outer motor body 414 (FIG. 12C) having a plurality of spaced-apart openings 416.

In the motors of the present invention, there is no requirement for gearing, and it can be controlled by a light gauge wire which is highly efficient and offers significant cost savings. By using small gauge wire, the Electro Magnetic Interference (EMI) is reduced which obviates the need for heavy duty switching.

The various components of the motor of the present invention can be made of traditional materials such as (preferably laminated) soft iron and mild steel. Alternatively, various newly-developed materials, such as Nylon 6 loaded with soft iron powders, can be used to further reduce eddy current losses. It will be understood that other magnetic materials, or combinations of the above and/or other magnetic materials can be used. As an example, with the rotors and the enclosure formed of Nylon 6 loaded with soft iron powders, the properties of one specific embodiment of the motor at 1 MHz with 92% loading might be a permeability of 25.71, a Q factor of 329, a loss factor X of 10–6 of 219 with a surface resistance of 70K ohms, a core plus coil resistance of 0.02 ohms and a core only resistance of 0.012 ohms. In fact, the newly-developed powder loaded plastics (polymers) can be made with hard or soft magnetic material, thus offering great flexibility.

In a preferred embodiment of the invention, the rotor, the enclosure and the spools (on which the coils are wound) are injection moulded and the entire-assembly simply snap-fits together onto a central shaft which, in turn, snap-fits into the outer motor body, with the control circuit (preferably in chip form) moulded into the body of the assembly. Such injection-moulded, snap-fit assembly greatly reduces the costs and manufacturing time which can otherwise be incurred by the use of complicated body shapes and multi-dimensional parts as in many prior art designs.

The motor of the invention does not require the use of brushes, thereby eliminating the production of sparks and having a relatively very low power consumption. Further, the construction of the motor is such that a screen is formed around it, thereby preventing RF interference;

In one specific embodiment of the invention, iron or steel balls can be used as the bearings and the active pole pieces, which gives a range of possible motor designs having a useful torque and very low operating noise characteristic.

Figure 13:
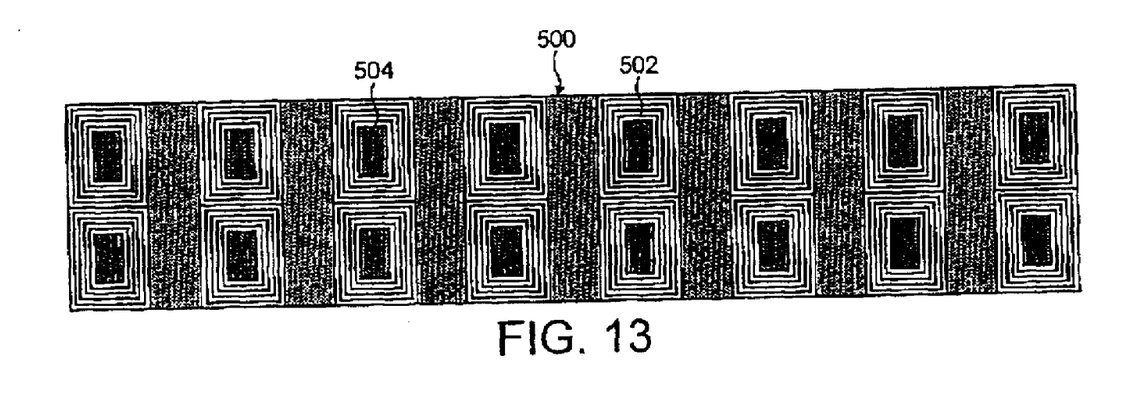
FIG. 13 is a plan view of the base for a linear motor according to an exemplary embodiment of She invention.
Figure 14:
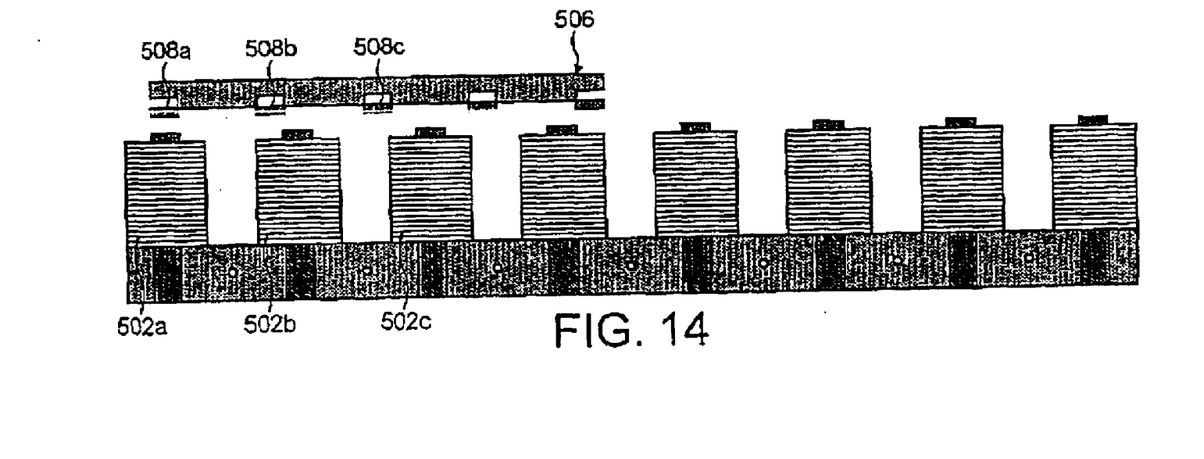
FIG. 14 is a schematic side view of a linear motor according to an exemplary embodiment of the invention.

Referring to FIG. 13 of the drawings, another exemplary embodiment of the invention provides a linear motor comprising a comb-like base 500 having coils 502 wound around the "comb teeth" 504 (perhaps in a triple pole coil, e.g. centre north and two south, or vice versa). Referring to FIG. 14 of the drawings, placed on top of the teeth 504 is a running rail with a carrier 506 (e.g. a castellated plate) which is analogous to the rotor in the motor described above, The running rail and carrier have a plurality of poles 508. Referring to FIG. 14, initially, the first pole 508*a* is in line with the first coil 502*a*. The second pole 508*b* is one "step" away from the next coil 502*b,* the third pole 508*c* is; two "steps" away from the third coil 502*c,* and so on. Each coil 502 is energised in sequence by feeding square top pulses that saturate the coil 502. When the first coil 502*a* is energised, a magnetic field is produced which attracts the first pole 508*a* one "step" towards the second coil 502*b*. The second pole 508*b* is now in line with the second coil 502*b*. When the second coil 502*b* is energised, a magnetic field is produced which attracts the second pole 508*b* towards the third coil 502*c* and the third pole 508*c* in line with the third coil 502*c*. Once again, the dimensions given in FIGS. 13 and 14 are merely intended to be illustrative.

The linear motor described above may be formed of one or more n-coil sections where n is an integer. In a specific embodiment, n may be 5 and in another specific-embodiment, n may be 11. If there are 5 coils, the first five coils are energised in sequence, and then the next five coils are energised in sequence and so on, thereby moving the "rotor" or moving bar along the length of the structure. Movement of the moving bar 506 can, of course, be reversed by reversing the sequence in which each 5-coil stage is energised.

The construction of the linear motor generally requires the same material properties as described in relation to the rotary unit. Thus, it can be constructed of materials such as soft iron and mild steel, polymers loaded with powdered magnetic material (such as Nylon 6 loaded, say 92%, with soft iron powder) or any other material having similar properties.

In the case of both the rotary and the linear motor embodiments, if the application is for a water pump or the like, the material would preferably be non-hydroscopic, so instead of a polymer such as nylon, propylene (or similar type of non-hydroscopic material) loaded with (say 90%+) magnetic powders could be used.

Although the motors of the present invention employ the "Stepper" principle, electromagnets are used instead of permanent magnets, thereby allowing them to freewheel when the power is removed. This allows manual operation of the equipment in the event of power failure. In addition, safety locks, which magnetically impede rotation and lock the motor when power is removed, can be built in where required.

It is the system electronics, i.e the microprocessor-based control circuit which provides the drive strategy controlling the speed, torque and efficiency of the motor. Thus, the same design of motor can be employed for several different applications. Further, a plurality of motors can be operated synchronously, either with each of the plurality of motors having a respective control circuit, the microprocessors of each of which being controlled by instructions from a central control module, or with a single control circuit providing the energising pulses to each of the plurality of motors by simply hard-wire connecting the output lines in parallel. A large powerful motor can be provided by connecting two (or more) motors together in tandem on the same shaft so that two (or more) rotors operated synchronously delivers twice (or more) the magnetic force to turn the shaft. It is also envisaged that a plurality of motors may be provided separately from each other, i.e. each driving a different shaft, with their operation being controlled by the same control circuit so that the coils of each motor are energised by the same sequence of pulses at exactly the same time to give synchronous operation. Thus, it can be seen that the motor of the present invention is immensely versatile because its operation is fully controllable.

Figure 15:
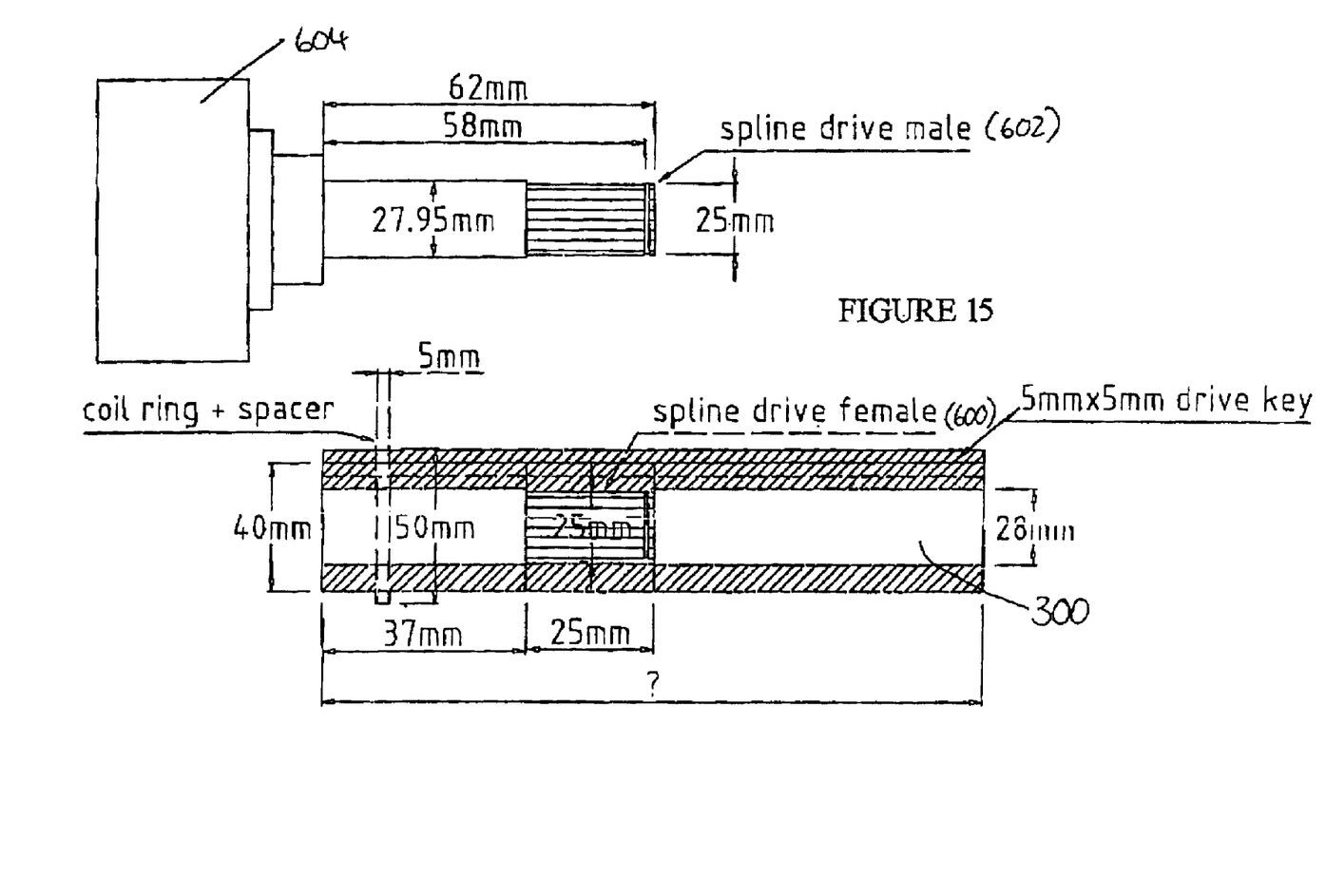
FIG. 15 is a schematic illustration of a type of coupling which can be used to couple a motor according to an exemplary embodiment of the invention to an arrangement it is required to drive.

In one specific application of an exemplary embodiment of the rotary motor of the present invention, it is envisaged that a motor vehicle such as a car could be driven by providing four such motors: one to drive each wheel of the vehicle, with one or more control circuits being used to provide the energising pulses synchronously to each of the motors, as described generally above. The motors could be attached to the respective wheels by providing a female spline drive 600 on the motor shaft 300 into which the male spline drive 602 provided on a standard wheel arrangement 604 would simply snap-fit, the motor shaft 300 thereby providing direct drive to the wheel arrangement 604 (see FIG. 15). It is envisaged that such an arrangement could be powered by a 45V battery (which provides a current of 2000 amps split into four for each of the wheel driving motors) to enable the vehicle to travel at 100 miles per hour over around 1000 miles. It is envisaged that the vehicle would be driven by wire (i.e. operation of an accelerator would control the operation of the control circuit. If, for example, the user presses the accelerator pedal with his toe, the vehicle would drive forwards and if he presses the pedal with his heel, the vehicle would stop. Reverse operation is effected by simply reversing the sequence in which the coils are energised, and could also be provided for by operation of the accelerator pedal.

In general, the motor of the present invention provides direct drive without the need for gears (in which significant losses can occur), particularly suited for, but not limited to, low to medium speed applications. It is extremely versatile and can be used in many different applications, giving precision of control and speed, and significant savings in cost, noise and weight.

Specific embodiments of the invention have been described by way of examples only, and it will be apparent to persons skilled in the art that modifications and variations can be made without departing from the scope of the invention.

What is claimed is:

1. A machine arrangement comprising a shaft on which is mounted n modules, where n is an integer, each module comprising at least one rotor, at least one stator and at least one respective coil, the at least one stator at least partially surrounding the periphery of the at least one rotor and the at least one coil, the at least one coil being wound as a stack of adjacent layers, each layer of the stack lying normal to the axis of rotation of the shaft at a point which is axially disposed on the shaft with respect to the adjacent layers of the stack, the layers comprising alternative windings which respectively extend radially inwardly and outwardly of the shaft.

2. An arrangement according to claim 1, wherein each module comprises two rotors with an energizing coil sandwiched therebetween.

3. An arrangement according to claim 1, comprising at least five modules mounted on the same shaft.

4. An arrangement according to claim 3, comprising at least eleven modules mounted on the same shaft.

5. An arrangement according to claim 1, wherein the or each rotor is provided with peripheral teeth.

6. An arrangement according to claim 5, wherein said teeth are substantially equally-spaced.

7. An arrangement according to claim 1, comprising two or more modules, wherein the rotors of at least some of the modules, are angularly displaced relative to each other.

8. An arrangement according to claim 7, wherein the rotors of all of the modules are angularly displaced relative to each other.

9. An arrangement according to claim 1, wherein the stator comprises inwardly projecting teeth.

10. An arrangement according to claim 9, wherein said inwardly projecting teeth substantially correspond to the teeth of respective rotor or rotors in both width and spacing.

11. An arrangement according to claim 1, comprising two or more modules, and further comprising a control circuit arranged to supply an energizing current to each of the coils in a predetermined sequence.

12. An arrangement according to claim 11, wherein the control circuit includes means for feeding a flyback current produced in the coil windings back to a power supply.

13. An arrangement according to claim 1, wherein the or each rotor is fixed to the shaft such that rotary movement of the or each rotor produces corresponding rotation of the shaft.

14. An arrangement according to claim 1, wherein the or each module comprises an individual stator.

15. An arrangement according to claim 1, comprising two or more modules, the at least one stator of each module joined to its respective stator to form a single body surrounding some or all of said modules.

16. An arrangement according to claim 1 in the form of an AC or DC motor.

17. An arrangement according claim 1 in the form of a DC generator or AC alternator.

18. An arrangement according to claim 1, wherein the at least one rotor comprises a plurality of cut away portions.

* * * * *